United States Patent [19]

Myojo et al.

[11] Patent Number: 5,112,681

[45] Date of Patent: May 12, 1992

[54] METHOD FOR TREATING A POLYPHENYLENE ETHER-POLYAMIDE MATERIAL, AND ARTICLES MADE BY SUCH A METHOD

[75] Inventors: Koji Myojo, Susono; Hiromichi Uohashi, Mishima, both of Japan

[73] Assignee: GE Plastics Japan, Ltd., Tokyo, Japan

[21] Appl. No.: 450,132

[22] Filed: Dec. 13, 1989

[30] Foreign Application Priority Data

Dec. 13, 1988 [JP] Japan .................................. 63-312822

[51] Int. Cl.⁵ .............................................. B32B 27/08
[52] U.S. Cl. .................................. 428/335; 428/474.4; 428/475.2; 428/475.5
[58] Field of Search ................... 428/474.4, 209, 475.5, 428/335, 475.2; 525/57, 64, 68

[56] References Cited

U.S. PATENT DOCUMENTS

| | | | |
|---|---|---|---|
| 4,657,970 | 4/1987 | Shiraki et al. | 525/57 |
| 4,873,136 | 10/1989 | Foust et al. | 428/209 |
| 4,908,259 | 3/1990 | Yumoto | 428/474.4 |
| 4,972,020 | 11/1990 | Shiraki et al. | 525/64 X |

*Primary Examiner*—Thomas J. Herbert, Jr.
*Attorney, Agent, or Firm*—Joseph T. Eisele; Francis T. Coppa

[57] ABSTRACT

Improved thermoplastic articles are described, which include a substrate molded from a composition of polyphenylene ether resin and polyamide resin, and a coating which is applied directly to the substrate, in the absence of a primer layer. The substrate can be pretreated with an acid processing agent and a surfactant processing agent.

6 Claims, No Drawings

METHOD FOR TREATING A POLYPHENYLENE ETHER-POLYAMIDE MATERIAL, AND ARTICLES MADE BY SUCH A METHOD

This invention relates to improved methods for treating polyphenylene ether (PPE)-polyamide materials, and articles made thereby.

In recent years, almost all automobile bumpers have been changed from metals to resins. In the conventional scheme, polypropylene resin is used as the resin for making the bumper. Recently, there is a significant trend in using the so-called colored bumpers, which are usually made of a polypropylene resin with a coating applied.

The coating of polypropylene resin is usually carried out as follows: the surface of the resin to be coated is degreased and washed with 1,1,1-trichloroethane; then, primer (or electroconductive primer) is applied. After the primer coating is dried by baking for 30-40 min in an oven at about 120° C., it is coated with surface paint by air spray coating (or electrostatic coating); finally, the upper coat is dried by baking for 30-40 min in an oven at about 120° C.

However, polypropylene resin has the disadvantage of a relatively low thermal deformation temperature. Hence, the baking-type paint (with a baking temperature of about 140° C.) used for coating the metallic automobile body cannot be used in this case. As a result, the durability of the coating on the bumper is worse than the durability of the automobile main body; in addition, as the coating of the resin parts must be carried out separately from the coating of the main body of the automobile, both colors cannot be totally in agreement with each other. This is a problem. Besides, because good adhesion between the base material and coating layer cannot be realized if the surface paint is coated directly on the base material of polypropylene resin; before the surface coating stage, it is necessary to wash using the vapor of 1,1,1-trichloroethane and coat with primer. This increases the coating cost, and is also a problem.

The purpose of this invention is to provide a type of coated resin moldings as well as the coating method of these resin moldings, in particular, automobile main bodies and bumpers, free of said problems.

Means used for solving the problems

To solve the aforementioned problems, the coating method of this invention is characterized by the following features: according to this coating method for resin molding and base material made mainly of polyphenylene ether resin and polyamide resin, said base material is first treated either successively or simultaneously by (A) acid processing agent containing inorganic acid, organic acid, and/or their salts, and (B) surfactant processing agent containing cationic, anionic, or bi-ionic surfactant; it may also be treated by an acidic processing liquid containing at least one type of said acids and salts, as well as the cationic, anionic, and amphoteric surfactants in a single liquid; then, without applying primer, the surface coat is applied using electrostatic coating scheme.

In addition, the type of coated resin moldings of this invention is characterized by the following features: the coated resin molding is made of a base material mainly made of polyphenylene ether resin and polyamide resin and polyamide resin, and coated with the surface coating layer without applying primer; the thickness of the coating layer is less than 50 $\mu$m; as far as the adhesion between the coating layer and base material is connected, according to the tape peeling test after the checkerboard pattern test based on JIS K 5400, the remaining percentage of the checkerboard pattern elements is 100/100; ductile damage is displayed even at a temperature as low as $-30°$ C.

The base materials for coating used in this invention are resin compounds mainly made of polyphenylene ether and polyamide.

The species of polyphenylene ether resin are well known. Preferred examples include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, as well as their copolymers with styrene.

Preferred examples of the polyamide resin species include polycaproamide (nylon 6), polyhexamethylene adipamide (nylon 66), polyhexamethylenesebacamide (nylon 610), polyundecanamide (nylon 11), polydodecanamide (nylon 12), amorphous nylon, as well as the copolymers and blends of these polyamides.

For said resin composites used as the base material, it is preferred that polyphenylene ether and polyamide be made compatible by compounds having specific functional groups, such as citric acid, maleic anhydride, epoxy compound, etc.

In addition, the following types of rubber-like polymers may be added into the polyphenylene ether resin and polyamide resin of the resin composites: natural rubber, butadiene polymer, butadiene-styrene copolymer and its hydrated species (random copolymer, block copolymer, graft copolymer, etc.), isoprene polymer, chlorobutadiene polymer, butadiene-acrylonitrile copolymer, isobutylene polymer, isobutylene-butadiene copolymer, isobutylene-isoprene copolymer, acrylate polymer, ethylenepropylene copolymer, ethylene-propylene-diene copolymer, Thiokol rubber, polysulfide rubber, polyurethane rubber, polyethylene rubber (such as polypropylene oxide, etc.), epichlorohydrin rubber, etc.; styrene-type polymers, such as the simple copolymers of styrene and its derivatives, as well as styrene-type polymers blended or modified by material and synthetic elastomer substances, such as polybutadiene, polyisoprene, butyl rubber, EPDM, ethylene-propyrene copolymer, natural rubber, epichlorohydrin; styrene-containing copolymers, such as styrene-acrylonitrile copolymer (SAN), styrene-maleic anhydride copolymer, styrene-acrylonitrile-butadiene copolymer (ABS), etc. According to this invention, the preferred styrene-type polymers include homopolystyrene and rubber-reinforced polystyrene, etc.

In addition, the conventional additives, such as inorganic filler, fire retarding agent, stabilizer, etc., may also be added.

In consideration of the properties of the molding, its adhesion with coating layer, surface appearance of the final product, etc., it is preferred that the proportions of polyphenylene ether and polyamide be in the range of 0-70 wt % and 100-30 wt %, respectively, with respect to the total amount of polyphenylene ether and polyamide in the resin composite used in this invention.

According to the method of this invention, in order to obtain excellent adhesion of the coating film and the excellent depositing property of the coating film in electrostatic coating, the material to be heated should be treated with acid processing agent containing inorganic acids, organic acids, and/or their salts, and surfactant processing agent containing cationic, anionic, or amphoteric surfactants.

The preferred inorganic acids that can be used in this invention include hydrochloric acid, sulfuric acid, phosphoric acid, and nitric acid; the preferred organic acids include formic acid, acetic acid, and propionic acid. Among them, phosphoric acid is particularly preferred. These acids are usually used in the form of the aqueous solution of 1 or several acids. In addition, the salts of said acids may also be used as the acid processing agent. These salts are usually used together with acids. However, if they are acidic, they may also be used alone. The concentration of acid in the acid processing aqueous solution for obtaining excellent adhesion and appearance of the coating layer depends on the acid type, treatment temperature, and treatment time. For example, in the case of phosphoric acid, if treatment is to be made at a temperature higher than 80° C. and for over 60 sec, a concentration lower than 0.001% may be used. However, for practical applications, it is preferred that L treatment be performed with a concentration of 1–5%, at a temperature in the range from room temperature (23° C.) to about 80° C. for 60–300 sec. In the case of 1–5% aqueous solution of phosphoric acid, if [the parameters] are outside the aforementioned ranges, the adhesion of the coating film is degraded or the appearance of the coated product becomes poor. This is undesirable.

For the cationic, anionic, and amphoteric surfactants used in this invention, as long as the surface resistance of said resin composite to be coated can be decreased from about 1013 Ωcm before the treatment to about 109 Ωcm after the treatment so that excellent depositing property can be realized in the electrostatic coating process, there is no special limitation on them. The preferred examples of the cationic surfactants include quaternary ammonium salts, halogenated alkylpyridium salts, higher amino halogenated salts, etc.

Examples of the preferred anionic surfactants include alkylsulfonate salts, alkyl sulfate salts, alkylarylsulfonate salts, etc. Examples of the preferred amphoteric surfactants include amino acids. These surfactants are usually used in the form of solution in water and/or alcohols (such as methyl alcohol, ethyl alcohol, propyl alcohol, isopropyl alcohol, butyl alcohol, etc.). For the concentration of surfactant in the solution, there is no special limitation. Usually, however, it is preferred to be of about 0.5% in the aqueous solution for practical application.

The treatment using said acids and surfactants can be performed successively or simultaneously by spraying, dipping, etc. In this case, the acids and surfactants may be contained either in different processing liquids or in a single liquid. The 2-stage scheme which performs acid treatment first and then surfactant treatment after water washing is particularly preferred.

According to the method of this invention, after the treatment using said acids and surfactants, coating of the surface paint is performed using the electrostatic coating scheme without applying a primer. The surface coating paints that can be used are those for surface coating of automobile main bodies, such as melamine-bridged type of polyester polyol resin paints, and other suitable paints.

Effects of the invention

This invention has the following effects.

(1) As the base material for coating is made of a resin composite made mainly of polyphenylene ether resin and polyamide resin with a high thermal deformation temperature, it is possible to use the same baking type paint used for an automobile main body. As a result, the color of the coating of the resin molding is identical to the color of the coating of the metal main body of the automobile. In addition, they may easily have the same durability. In addition, it becomes possible to perform coating for the resin moldings and coating for the automobile bodies on the same line at the same time. As a result, there is no need to prepare special coating equipments for the resin moldings.

(2) By treatment using acids and surfactants, excellent adhesion and depositing property can be realized in the electrostatic coating operation. Hence, there is no need to clean with 1,1,1-trichloroethane vapor and coat with primer, which are indispensable stages in the conventional case for obtaining excellent adhesion to the base material by polyphenylene resin. As a result, the coating cost can be reduced.

(3) The impact strength, i.e., ductility at low temperature, can be improved significantly. The mechanism is as follows: in the conventional case when primer is applied, when the surface coating layer is impacted and cracked, said crack acts as a type of notch because the resin is forcibly adhered to the surface coating layer via the primer. On the other hand, in this invention, as there is no primer, the notch effect does not take place. That is, in this invention, the surface coating layer is adhered to the resin appropriately without using primer.

In the following, this invention will be explained in more detail with reference to application examples.

APPLICATION EXAMPLE 1

The base material was made of a piece (100 mm × 100 mm × 3 mm) of NORYL GTX 6002 (trademark, a resin composite mainly made of polyphenylene ether and polyamide, product of Engineering o Plastics Co., Ltd.). The base material piece was dipped in the acid processing solution of phosphoric acid, BONDELITE PBL3080 (trademark, a phosphoric acid type surface chemical processing agent, product of Nippon Parkerizing Co., Ltd.)), or GRANODINE (trademark, a phosphoric acid type surface chemical processing agent, product of Nippon Paint Co., Ltd.) with various concentrations listed in Table I and for various times and at various temperatures listed in Table I. Then the sample was washed by water, dipped in the solution of EREAK [transliteration] PS 909 (trademark, a cationic surfactant (stearamide propyldimethyl β-hydroxyethylammonium nitrate), product of Yoshimura Oil Chemical Co., Ltd.) with concentrations listed in Table I, followed by air drying.

The base material treated as above was coated with paint of WS AMIRAK W06T OP WHITE (trademark, product of Kansai Paint Co., Ltd.) using the electrostatic coating method. After letting stand for 10 min, it was baked for 30 min at 140° C. to form a 35–40-μm-thick coating film.

The obtained test pieces were evaluated by visual observation of their coating appearances. In addition, the following tests on the coating adhesion property were carried out.

(1) Initial adhesion property test

After the checkerboard pattern test according to JIS K 5400, the tape peeling test was carried out, and the number of the elements remaining among 100 elements was counted.

(2) Secondary adhesion property test

After the test piece was dipped in warm water (40° C.) for 10 days, the same test as the aforementioned initial adhesion property test was carried out.

The results of the aforementioned evaluations and tests are listed in Table I. Table I also lists the values of surface resistance after treatment using surfactants.

TABLE I

| 1 | 2 | 3 | 4 | 5 | 6 | 7 | 8 | 9 | 10 |
|---|---|---|---|---|---|---|---|---|---|
| 11 | 0.0001 | 40 | 120 | PS 909 | 0.5 | $1.1 \times 10^9$ | 100/100 | 100/100 | 12 |
| ″ | ″ | ″ | 600 | ″ | ″ | ″ | ″ | ″ | ″ |
| ″ | ″ | 60 | 120 | ″ | ″ | ″ | ″ | ″ | ″ |
| ″ | ″ | ″ | 600 | ″ | ″ | ″ | ″ | ″ | ″ |
| ″ | ″ | 80 | 90 | ″ | ″ | ″ | ″ | ″ | ″ |
| ″ | ″ | ″ | 600 | ″ | ″ | ″ | ″ | ″ | ″ |
| ″ | 0.001 | 40 | 120 | ″ | ″ | ″ | ″ | ″ | ″ |
| ″ | ″ | ″ | 600 | ″ | ″ | ″ | ″ | ″ | ″ |
| ″ | ″ | 60 | 120 | ″ | ″ | ″ | ″ | ″ | ″ |
| ″ | ″ | ″ | 600 | ″ | ″ | ″ | ″ | ″ | ″ |
| ″ | ″ | 80 | 60 | ″ | ″ | ″ | ″ | ″ | ″ |
| ″ | ″ | ″ | 600 | ″ | ″ | ″ | ″ | ″ | ″ |
| ″ | 0.01 | 40 | 120 | ″ | ″ | ″ | ″ | ″ | ″ |
| ″ | ″ | ″ | 600 | ″ | ″ | ″ | ″ | ″ | ″ |
| ″ | ″ | 60 | 90 | ″ | ″ | ″ | ″ | ″ | ″ |
| ″ | ″ | ″ | 600 | ″ | ″ | ″ | ″ | ″ | ″ |
| ″ | ″ | 80 | 30 | ″ | ″ | ″ | ″ | ″ | ″ |
| ″ | ″ | ″ | 600 | ″ | ″ | ″ | ″ | ″ | ″ |
| 11 | 0.1 | 40 | 120 | PS 909 | 0.5 | $1.1 \times 10^9$ | 100/100 | 100/100 | 12 |
| ″ | ″ | ″ | 600 | ″ | ″ | ″ | ″ | ″ | ″ |
| ″ | ″ | 60 | 60 | ″ | ″ | ″ | ″ | ″ | ″ |
| ″ | ″ | ″ | 600 | ″ | ″ | ″ | ″ | ″ | ″ |
| ″ | ″ | 80 | 30 | ″ | ″ | ″ | ″ | ″ | ″ |
| ″ | ″ | ″ | 600 | ″ | ″ | ″ | ″ | ″ | ″ |
| ″ | 1.0 | 40 | 90 | ″ | ″ | ″ | ″ | ″ | ″ |
| ″ | ″ | ″ | 600 | ″ | ″ | ″ | ″ | ″ | ″ |
| ″ | ″ | 60 | 60 | ″ | ″ | ″ | ″ | ″ | ″ |
| ″ | ″ | ″ | 600 | ″ | ″ | ″ | ″ | ″ | ″ |
| ″ | ″ | 80 | 30 | ″ | ″ | ″ | ″ | ″ | ″ |
| ″ | ″ | ″ | 600 | ″ | ″ | ″ | ″ | ″ | ″ |
| ″ | 5.0 | 23 | 30 | ″ | ″ | ″ | ″ | ″ | ″ |
| ″ | ″ | ″ | 300 | ″ | ″ | ″ | ″ | ″ | ″ |
| ″ | ″ | 40 | 30 | ″ | ″ | ″ | ″ | ″ | ″ |
| ″ | ″ | ″ | 180 | ″ | ″ | ″ | ″ | ″ | ″ |
| ″ | ″ | 60 | 30 | ″ | ″ | ″ | ″ | ″ | ″ |
| ″ | ″ | ″ | 180 | ″ | ″ | ″ | ″ | ″ | ″ |
| 11 | 5.0 | 80 | 30 | PS 909 | 0.5 | $1.1 \times 10^9$ | 100/100 | 100/100 | 12 |
| ″ | ″ | ″ | 180 | ″ | ″ | ″ | ″ | ″ | ″ |
| ″ | 10.0 | 23 | 30 | ″ | ″ | ″ | ″ | ″ | ″ |
| ″ | ″ | ″ | 180 | ″ | ″ | ″ | ″ | ″ | ″ |
| ″ | ″ | 40 | 30 | ″ | ″ | ″ | ″ | ″ | ″ |
| ″ | ″ | ″ | 90 | ″ | ″ | ″ | ″ | ″ | ″ |
| ″ | ″ | 60 | 30 | ″ | ″ | ″ | ″ | ″ | ″ |
| ″ | ″ | ″ | 90 | ″ | ″ | ″ | ″ | ″ | ″ |
| ″ | ″ | 80 | 30 | ″ | ″ | ″ | ″ | ″ | ″ |
| ″ | ″ | ″ | 60 | ″ | ″ | ″ | ″ | ″ | ″ |
| PBL 3080 | 0.5 | 60 | 900 | ″ | ″ | ″ | ″ | ″ | ″ |
| 13 | ″ | 80 | 180 | ″ | ″ | ″ | ″ | ″ | ″ |
| ″ | ″ | ″ | 900 | ″ | ″ | ″ | ″ | ″ | ″ |
| ″ | 1.0 | 40 | 300 | ″ | ″ | ″ | ″ | ″ | ″ |
| ″ | ″ | ″ | 900 | ″ | ″ | ″ | ″ | ″ | ″ |
| PBL 3080 | ″ | 60 | 90 | ″ | ″ | ″ | ″ | ″ | ″ |
| ″ | ″ | ″ | 900 | ″ | ″ | ″ | ″ | ″ | ″ |
| ″ | ″ | 80 | 90 | ″ | ″ | ″ | ″ | ″ | ″ |
| PBL 3080 | 1.0 | 80 | 900 | PS 909 | 0.5 | $1.1 \times 10^9$ | 100/100 | 100/100 | 12 |
| ″ | 5.0 | 23 | 180 | ″ | ″ | ″ | ″ | ″ | ″ |
| ″ | ″ | ″ | 900 | ″ | ″ | ″ | ″ | ″ | ″ |
| ″ | ″ | 40 | 90 | ″ | ″ | ″ | ″ | ″ | ″ |
| ″ | ″ | ″ | 300 | ″ | ″ | ″ | ″ | ″ | ″ |
| ″ | ″ | 60 | 60 | ″ | ″ | ″ | ″ | ″ | ″ |
| ″ | ″ | ″ | 300 | ″ | ″ | ″ | ″ | ″ | ″ |
| ″ | ″ | 80 | 30 | ″ | ″ | ″ | ″ | ″ | ″ |

TABLE I-continued

| 1 | 2 | 3 | 4 | 5 | 6 | 7 | 8 | 9 | 10 |
|---|---|---|---|---|---|---|---|---|----|
| " | " | " | 300 | " | " | " | " | " | " |

Key:
1 Acid processing agent
2 Concentration of acid processing agent (wt %)
3 Acid processing temperature (°C)
4 Acid processing time (sec)
5 Surfactant
6 Surfactant concentration (wt %)
7 Surface resistance (Ωcm)
8 Initial adhesion
9 Secondary adhesion
10 Coating appearance
11 Phosphoric acid
12 Good
13 GRANODINE

APPLICATION EXAMPLE 2

A test was performed in the same way as in Application Example 1 except that the following surfactants with various concentrations were used. The results are listed in Table II.

EREAK PS 909:
Trademark, product of Yoshimura Oil Chemical Co., Ltd., cationic surfactant
EREAK PS 905
Trademark, product of Yoshimura Oil Chemical Co., Ltd., anionic surfactant (Na salt of alkylsulfonate)
TEXANOL A-8
Trademark, product of Yoshimura Oil Chemical Co., Ltd., amphoteric surfactant (alkyl betain)

APPLICATION EXAMPLE 3

A test was performed in the same way as in Application Example 1 except that the aqueous solution contained 5.0% of acid processing agent PBL 3080 and 0.5% of surfactant EREAK PS 909 simultaneously in a single liquid. The results of the test are listed in Table III.

TABLE III

| 1 | 2 | 3 | 4 | 5 | 6 | 7 | 8 | 9 | 10 |
|---|---|---|---|---|---|---|---|---|----|
| PBL 3080 | 5.0 | 23 | 180 | 11 PS 909 | 0.5 | $5.1 \times 10^9$ | 100/100 | 100/100 | 12 |
| PBL 3080 | " | 40 | " | " | " | " | 100/100 | " | " |
| PBL 3080 | " | 60 | " | " | " | " | 100/100 | " | " |
| PBL 3080 | " | 80 | " | " | " | " | 100/ | " | " |

TABLE II

| 1 | 2 | 3 | 4 | 5 | 6 | 7 | 8 | 9 | 10 |
|---|---|---|---|---|---|---|---|---|----|
| PBL 3080 | 5.0 | 60 | 120 | 11 PS 909 | 0.1 | $5.6 \times 10^9$ | 100/100 | 100/100 | 12 |
| " | " | " | " | " | 0.3 | $1.9 \times 10^9$ | " | " | " |
| " | " | " | " | " | 0.5 | $1.1 \times 10^9$ | " | " | " |
| " | " | " | " | " | 1.0 | $4.7 \times 10^8$ | " | " | " |
| " | " | " | " | " | 3.0 | $1.2 \times 10^8$ | " | " | " |
| " | " | " | " | " | 5.0 | $8.7 \times 10^7$ | " | " | " |
| " | " | " | " | " | 10.0 | $4.0 \times 10^7$ | " | " | " |
| " | " | " | " | 11 PS 905 | 0.1 | $6.2 \times 10^{10}$ | " | " | 12 |
| " | " | " | " | " | 0.3 | $1.4 \times 10^{10}$ | " | " | " |
| " | " | " | " | " | 0.5 | $5.9 \times 10^9$ | " | " | " |
| " | " | " | " | " | 1.0 | $4.4 \times 10^8$ | " | " | " |
| " | " | " | " | " | 3.0 | $7.2 \times 10^8$ | " | " | " |
| " | " | " | " | " | 5.0 | $6.4 \times 10^8$ | " | " | " |
| " | " | " | " | " | 10.0 | $1.2 \times 10^8$ | " | " | *13 |
| PBL 3080 | 5.0 | 60 | 120 | 14 A-8 | 0.1 | $5.4 \times 10^{10}$ | 100/100 | 100/100 | 12 |
| " | " | " | " | " | 0.3 | $4.3 \times 10^9$ | " | " | " |
| " | " | " | " | " | 0.5 | $7.9 \times 10^8$ | " | " | " |
| " | " | " | " | " | 1.0 | $1.3 \times 10^8$ | " | " | " |
| " | " | " | " | " | 3.0 | $9.5 \times 10^7$ | " | " | " |
| " | " | " | " | " | 10.0 | $7.0 \times 10^7$ | " | " | *13 |

13
Key:
1 Acid processing agent
2 Acid processing agent concentration (wt %)
3 Acid processing temperature
4 Acid processing time (sec)
5 Surfactant
6 Surfactant concentration (wt %)
7 Surface resistance (Ωcm)
8 Initial adhesion
9 Secondary adhesion
10 Coating appearance
11 EREAK
12 Good
13 *With creeping of paint
14 TEXANOL TABLE III-continued

| 1 | 2 | 3 | 4 | 5 | 6 | 7 | 8 | 9 | 10 |
|---|---|---|---|---|---|---|---|---|---|
| 3080 | | | | | | | 100 | | |

Key:
1 Acid processing agent
2 Acid processing agent concentration (wt %)
3 Acid processing temperature
4 Acid processing time (sec)
5 Surfactant
6 Surfactant concentration (wt %)
7 Surface resistance (Ω cm)
8 Initial adhesion
9 Secondary adhesion
10 Coating appearance
11 EREAK
12 Good

APPLICATION EXAMPLE 4

The treatment and coating operations were carried out in the same way as in Application Example 1 except that the acid processing was carried out by dipping for 5 min in 5 wt % aqueous solution of BONDELITE PBL 3080 and the surfactant processing was carried out with 0.5 wt % isopropyl alcohol solution of EREAK PS 909 The obtained test pieces had 4 types of coating layers with dry film thickness of 25 μm, 35 μm, 50 μm, and 70 μm. respectively.

The obtained test pieces were then used in the punch test using a high-speed lead impact tester (product of Shimadzu Corp.); the damage state was observed, and the damage energy and the maximum load were measured. The measurement conditions were as follows.

| Temperature: | 23° C. and −30° C. |
|---|---|
| Impact core speed: | 5 cm/sec and 5 m/sec |
| Impact core diameter: | 12.7 mm |
| Lower hole diameter: | 25.4 mm |

In addition, the test pieces were positioned with the coated surface facing either downward (with an impact core speed of 5 cm/sec, Table IV) or upward (with an impact core speed of 5 m/sec, Table V).

The test results are listed in Tables IV and V. In Tables IV and V, the "damage state" is represented by B/A (where A is the total number of test pieces used in the test, and B is the number of test pieces with ductile damage).

COMPARATIVE EXAMPLE 1

The same base material as in Application Example 4 was used in this case. After washing with isopropyl alcohol, the primer of SOFREX No. 6100 (trademark, product of Kansai Paint Co., Ltd.) was coated using an air spray gun to ensure a dried film thickness of 5 μm. After setting for 10 min, SPX 36 GREY (trademark, product of Kansai Paint Co., Ltd.) was coated as the intermediate paint with a dry film thickness of 35 μm. The samples were cured by baking for 30 min in an air oven at 140° C. Then, WS AMIRAK W06 TOP WHITE was added as the surface coating paint by using the electrostatic coating scheme to ensure dry film thicknesses of 25 μm, 35 μm, 50 μm, and 70 μm, respectively. After setting for 10 min, the samples were cured by baking for 30 min in an air oven at 140° C., forming the test pieces with the aforementioned 4 types of surface coating films with different thicknesses.

The obtained test pieces were tested in the same way as in Application Example 4. The results of the tests are listed in Table IV.

COMPARATIVE EXAMPLE 2

A test was carried out in the same way as in Comparative Example 1 except that no intermediate paint was applied. The results of the test are listed in Tables IV and V.

COMPARATIVE EXAMPLE 3

The same punch test as described above was conducted for the base material without coating layer. The results of the test are listed in Tables IV and V.

As indicated by Tables IV and V, the resin moldings of this invention exhibit significant impact strength at −30° C.; at room temperature, the impact strength is similar to that of the conventional type. It is totally unexpected that such an excellent low-temperature impact strength and excellent coating adhesion could be realized without applying primer according to this invention.

TABLE IV

| 1 | 2 μm | 3 μm | 4 μm | 5 6 | 7 (kg-cm) | 8 (kg) | 9 |
|---|---|---|---|---|---|---|---|
| 10 | 12 | 12 | 25 | 23° C. | 368 | 375 | 5/5 |
| 4 | | | 35 | | 356 | 397 | 5/5 |
| | | | 50 | | 339 | 413 | 5/5 |
| | | | 70 | | 314 | 432 | 5/5 |
| 11 | 13 | 13 | 25 | 23° C. | 388 | 364 | 5/5 |
| 1 | | | 35 | | 405 | 376 | 5/5 |
| | | | 50 | | 441 | 391 | 5/5 |
| | | | 70 | | 460 | 413 | 5/5 |
| 11 | 13 | 12 | 25 | 23° C. | 371 | 360 | 5/5 |
| 2 | | | 35 | | 383 | 385 | 5/5 |
| | | | 50 | | 400 | 391 | 5/5 |
| | | | 70 | | 419 | 402 | 5/5 |
| 11 | 12 | 12 | 12 | 23° C. | 378 | 342 | 5/5 |
| 3 | | | | | | | |
| 10 | 12 | 12 | 25 | −30° C. | 399 | 508 | 5/5 |
| 4 | | | 35 | | 385 | 512 | 5/5 |
| | | | 50 | | 361 | 530 | 5/5 |
| | | | 70 | | 94 | 107 | 0/5 |
| 11 | 13 | 13 | 25 | −30° C. | 256 | 308 | 3/5 |
| 1 | | | 35 | | 151 | 211 | 1/5 |
| | | | 50 | | 93 | 195 | 0/5 |
| | | | 70 | | 31 | 69 | 0/5 |
| 11 | 13 | 12 | 25 | −30° C. | 300 | 471 | 5/5 |
| 2 | | | 35 | | 254 | 480 | 4/5 |
| | | | 50 | | 140 | 352 | 1/5 |
| | | | 70 | | 34 | 80 | 0/5 |
| 11 | 12 | 12 | 12 | −30° C. | 445 | 342 | 5/5 |
| 3 | | | | | | | |

TABLE V

| 1 | 2 μm | 3 μm | 4 μm | 5 6 | 7 (kg-cm) | 8 (kg) | 9 |
|---|---|---|---|---|---|---|---|
| 10 | 12 | 12 | 25 | 23° C. | 451 | 621 | 5/5 |
| 4 | | | 35 | | 448 | 614 | 5/5 |
| | | | 50 | | 457 | 603 | 5/5 |
| | | | 70 | | 466 | 631 | 5/5 |
| 11 | 13 | 13 | 25 | 23° C. | 501 | 632 | 5/5 |
| 1 | | | 35 | | 508 | 628 | 5/5 |
| | | | 50 | | 525 | 648 | 5/5 |
| | | | 70 | | 564 | 669 | 5/5 |
| 11 | 13 | 12 | 25 | 23° C. | 468 | 617 | 5/5 |
| 2 | | | 35 | | 497 | 604 | 5/5 |
| | | | 50 | | 504 | 615 | 5/5 |
| | | | 70 | | 543 | 642 | 5/5 |
| 11 | 12 | 12 | 12 | 23° C. | 531 | 618 | 5/5 |
| 3 | | | | | | | |
| 10 | 12 | 12 | 25 | −30° C. | 714 | 1009 | 5/5 |
| 4 | | | 35 | | 700 | 1015 | 5/5 |
| | | | 50 | | 660 | 945 | 4/5 |

TABLE V-continued

| 2 μm | 3 μm | 4 μm | 6 | 5 7 (kg-cm) | 8 (kg) | 9 |
|---|---|---|---|---|---|---|
| 11 1 | 13 | 13 | 25 35 50 70 | −30° C. | 141 251 247 189 160 | 409 765 774 741 600 | 0/5 0/5 0/5 0/5 0/5 |
| 11 2 | 13 | 12 | 25 35 50 70 | −30° C. | 304 291 283 170 | 791 791 781 594 | 0/5 0/5 0/5 0/5 |
| 11 3 | 12 | 12 | 12 | −30° C. | 564 | 859 | 5/5 |

Key:
1 Impact core speed: 5 cm/sec. coated surface facing downward
2 Primer
3 Intermediate coating layer
4 Surface coating layer
5 High-speed load impact test results
6 Test results
7 Damage energy
8 Maximum load
9 Damage state
10 Application Example
11 Comparative Example
12 None
13 Yes
14 Impact core speed = 5 m/sec. coated surface facing downward

APPLICATION EXAMPLE 5

In this application example, a comparison was made for the depositing property when treatment was performed using surfactants and in other cases. As the surfactants, EREAK PS 909 and plastic electroconducting agent NC (trademark, product of Kasho Co., Ltd., cationic surfactant (quaternary ammonium salt)) were used.

A box without a lid (200 cm×150 cm×5 cm) was molded from base material of NORYL GTX 6002 (thickness 3 mm). After the same treatment as in Application Example 4 was performed for the molding, paint was blown on the molding for the same number of rounds using an electrostatic (REA III type unit (product of Ranzubagugema K. K.), applied voltage 60000 V), and the depositing property was visually evaluated on the surface, side surfaces, and inner surfaces (within the box) of the molding. The results are listed in Table V.

| 1 | 2 | 3 | 4 5 | 6 | 7 |
|---|---|---|---|---|---|
| — | 8 | KP-#6100 | ○ | ○ | ○ |
| — | 8 | — | ○ | △ | X |
| NC | 8 | — | ○ | ○ | ○ |
| PS 909 | 8 | — | ○ | ○ | ○ |

○: Large amount attached
△: Intermediate amount attached
X: Almost none attached
KP-#6100: electroconductive primer (Kansai Paint Co., Ltd.)
Key:
1 Surfactant
2 Presence of ground
3 Electroconductive primer
4 Attachment of dye
5 Surface
6 Side surfaces
7 Inner surfaces
8 Yes

We claim:

1. An improved paint adhered thermoplastic article, which comprises;
    a substrate molded from a thermoplastic consisting essentially of a mixture of 0 to 70 weight percent of polyphenylene ether resin and 30 to 100 weight percent of a thermoplastic polyamide resin: and
    a paint coating adhered directly to the substrate in the absence of an intervening primer coating, said paint coating having a thickness, as cured, of less than 50 microns.

2. The article of claim 1, wherein the polyphenylene ether resin is selected from the group consisting of poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, and copolymers of any of the foregoing with styrene.

3. The article of claim 1, wherein the polyphenylene ether and polyamide have been compatibilized by the presence of an agent selected from the group consisting of maleic anhydride, citric acid, and epoxy compounds.

4. The article of claim 1, wherein the substrate further consists of at least one additive selected from the group consisting of inorganic fillers, flame retardants and stabilizers.

5. The article of claim 1, wherein the paint coating is a paint suitable for automobile surfaces.

6. The article of claim 5, wherein the paint coating comprises a melamine-bridged polyester polyol resin paint.

* * * * *